United States Patent [19]

Mirle et al.

[11] Patent Number: 5,500,470
[45] Date of Patent: Mar. 19, 1996

[54] COMPOSITION FOR UTILIZING SYNTHETIC POLYMER PACKAGES

[75] Inventors: Srinivas K. Mirle, Ellicott City; Eugene E. Carney, Sykesville, both of Md.

[73] Assignee: W.R. Grace & Co.-Conn., New York, N.Y.

[21] Appl. No.: 300,887

[22] Filed: Sep. 6, 1994

[51] Int. Cl.$^6$ ................... C08K 5/04; C08K 5/16
[52] U.S. Cl. .................. 524/204; 524/83; 524/167; 524/238; 524/240; 524/262; 524/501; 524/502
[58] Field of Search ..................... 524/204, 262, 524/238, 240, 501, 502, 167, 83; 428/511, 514

[56] References Cited

U.S. PATENT DOCUMENTS 3,734,801  5/1973  Sebel .................... 156/309
4,148,111  4/1979  Lieberman .................... 16/59
4,365,710  12/1982  Swanson .................... 206/386
4,418,111  11/1983  Carstens .................... 428/145
4,452,723  6/1984  Carstens .................... 252/313
5,342,871  8/1994  Clinnin et al. .................... 524/238

FOREIGN PATENT DOCUMENTS 3101812.2  1/1981  Germany.

*Primary Examiner*—Kriellion S. Morgan
*Attorney, Agent, or Firm*—Valerie E. Looper

[57] ABSTRACT

A water-based bonding agent material made of an acrylic polymer or copolymer emulsion, metal salt complexed with an amine and surfactant is useful for unitizing packages having synthetic polymer surfaces.

9 Claims, No Drawings

COMPOSITION FOR UTILIZING SYNTHETIC POLYMER PACKAGES

FIELD OF THE INVENTION

The present application relates to water-based materials for unitizing packages that have synthetic polymer surfaces. These materials are made of an acrylic polymer or copolymer emulsion in water, a drying agent, and a surfactant. Additional water and preservatives may be added. The resulting formulation is sprayed on the surfaces to be bonded, and upon drying, has a high shear strength and very low peel strength. Once the bond is broken, the residue is non-tacky and clear. The formulation is especially useful for stabilizing pallet loads of packages that have synthetic polymer surfaces.

BACKGROUND OF THE INVENTION

When corrugated boxes and polyolefin bags are stacked on pallets, it is desirable that these boxes or bags remain in a stable group, or unitized. This is particularly important for warehousing operations. Large numbers of boxes or bags are piled on wooden pallets and moved from place to place on forklifts. The pallets may be raised on elevators for warehouse storage or for long-distance transport. When the stored item is actually used, a single box or bag may be picked up and carried, for example, by a plant operator. Various devices are used to unitize pallet loads, including plastic straps, glues, hot melt adhesives and stretch wrapped films.

Now there is a simple, economical way to securely unitize pallet loads of synthetic polymer or polymer-coated packages that reduces or eliminates the need for stretch-wrapped films and also avoids the residue and surface damage caused by glues and hot melt adhesives. A water-based bonding agent can be manually or automatically sprayed on packages as they move along a conveyor. The bonding agent begins working virtually immediately as containers are stacked on the pallet, forming a tight, no-slip bond that prevents the load from shifting during warehouse handling or distribution.

When depalletized, the packages separate easily, without tearing or defacing the outer surfaces. The bonding agent is also preferably for single use. Once the packages are separated, they do not re-bond to one another.

The bonding agent is clear on drying, nontoxic, nonflammable, and is aqueous based instead of relying on volatile organic solvents. It is virtually invisible when containers are separated, leaving no sticky residue. It does not interfere with readings taken by automatic scanners, and does not affect the recyclability of synthetic polymer packaging.

Various types of materials are known which can be applied to different types of packages to stabilize palletized containers.

For example, in U.S. Pat. No. 3,734,801, issued to Sebel on May 22, 1973 relates to an aqueous colloidal adhesive made of xanthan gum and possibly other additives such as polyvinyl methyl ether and finely divided silicic acid. This material is disclosed to be useful with paper, cardboard, or pasteboard.

Palletizing aids are known for use with fibrous or cardboard containers, as seen, for example, in U.S. Pat. Nos. 4,148,111 and 4,452,723 issued Nov. 29, 1983 and Jun. 5, 1984 respectively to Carstens, which relate to a non-skid composition made of an aqueous suspension of colloidal silica and urea.

Palletizing adhesives are known for use with polyolefin packaging and polymer or wax-coated boxes, but many of the known materials, such as those disclosed in European patent publication EP 278 888, are based on organic solvents, which often present environmental difficulties. As a result, stretch-wrapped film is typically used for palletizing polyolefin packages.

A reusable adhesive coating for pallets supporting oily or lubricated articles is disclosed in German patent publication DE 3101812 A1. This coating contains permanent pressure sensitive adhesives and silanes, (page 1 of translation) and has a drying time of 2–3 days (page 13, last line, to page 14, line 1). It is applied to "pallets" that transport single workpieces between workstations (page 5, lines 1–18). These pallets are specifically adapted for use with handling robots, and are intended to be re-usable (page 6, lines 16–19).

OBJECTS OF THE INVENTION

It is an object of the present invention to provide bonding agents that are aqueous-based, have good shear strength and low peel strength when used on packages with synthetic polymer surfaces, demonstrate good wettability on synthetic polymer films, and have fast drying rates. It is a further object of this invention to provide a unitizing bonding agent for palletizing synthetic polymer and coated fiber packages or shipping containers.

The bonding agents of the present invention offer a number of advantages over known palletizing systems, providing packagers with a more stable and less expensive method of unitizing than stretch-wrapped films or shrink bags, without the residue and adverse effects of cold glues or hot adhesives. Further, they are aqueous-based, and need not contain any volatile organic compounds.

These bonding agents can be applied between synthetic polymer surfaces, and upon drying, yield a strong bond that can withstand high tensile forces. The high tensile strength will prevent the packages from sliding across one another during warehousing operations such as unitizing, forklift maneuvers, storage, and during subsequent transport. Conversely, the bond formed between the synthetic polymer surfaces also has a low peel strength, so that the packages can be easily lifted off at will during the depalletizing operation. Once the packages are separated, they will not re-bond.

The present invention offers a number of advantages over stretch-wrapped film in particular, as the bonding agents create no solid waste, can maintain load integrity after partial breakdown of the palletized load, and do not interfere with the reading of graphics or product codes.

Further, the bonding agents can be applied in very thin (atomized) layers which are clean, clear drying, and leave no residue. They are ideal for robotic operations or integration into automatic palletizers, and can contribute to increased through-put.

These and other objects and advantages of the invention are obtained by compositions which typically comprise the following: an acrylic polymer or copolymer emulsion in water, the polymer or copolymer having film-forming properties and, typically, a glass transition temperature of <25° C.; a surfactant having an HLB of <20; and a drying agent made of a metal salt which is preferably complexed with an amine. It is typical to add a preservative, and small amounts of other ingredients can be added without changing the essential nature of the composition.

DETAILED DESCRIPTION OF THE INVENTION

As discussed above, these compositions typically comprise the following: a polymer emulsion, a surfactant, and a drying agent, as well as other additives such as a preservative. Minor amounts of other additives can be included without changing the essential nature of the composition.

POLYMER EMULSION

We have found that the basic constituent of our composition is an emulsion (or blend of emulsions) of an acrylic polymer or copolymer that forms a film on drying and is fairly compatible with the synthetic polymer surface. The acrylic polymer may be a homopolymer or copolymer of acrylate and methacrylate monomers. However, it is preferable to use a copolymer with hydrophilic and hydrophobic components that are compatible with the water as well as the synthetic polymer surface.

Apart from acrylates and methacrylates, other non-limiting monomers useful in forming the hydrophobic portion of the copolymer include vinylidene chloride, styrene, vinyl chloride, vinyl acetate.

Examples of acrylates include methyl acrylate, ethyl acrylate, propyl acrylate, butyl acrylate, amyl acrylate, ethylhexyl acrylate, octyl acrylate, t-octyl acrylate, 2-methoxyethyl acrylate, 2-butoxyethyl acrylate, 2-phenoxyethyl acrylate, chloroethyl acrylate, cyanoethyl acrylate, dimethylaminoethyl acrylate, benzyl acrylate, methoxybenzyl acrylate, furfuryl acrylate, phenyl acrylate, and the like.

Examples of methacrylates include methyl methacrylate, ethyl methacrylate, propyl methacrylate, isopropyl methacrylate, amyl methacrylate, hexyl methacrylate, cyclohexyl methacrylate, benzyl methacrylate, cyanoacetoxyethyl methacrylate, chlorobenzyl methacrylate, octyl methacrylate, N-ethyl-N-phenylaminoethyl methacrylate, 2-methoxyethyl methacrylate, 2-(3-phenylpropyloxy)ethyl methacrylate, dimethylaminophenoxyethyl methacrylate, furfuryl methacrylate, phenyl methacrylate, cresyl methacrylate, naphthyl methacrylate, and the like.

Examples of monomers which provide the hydrophilic portion of the copolymer include those monomers having groups such as carboxyl, sulfonate, hydroxy and other polar groups.

Examples of hydroxy-containing monomers include hydroxyethyl acrylate, hydroxyethyl methacrylate, hydroxypropyl methacrylate, hydroxypropyl acrylate, 3-chloro-2-hydroxypropyl acrylate, 3-chloro-2-hydroxypropyl methacrylate, 2,2-dimethylhydroxypropyl acrylate, 5-hydroxypentyl acrylate, diethylene glycol monoacrylate trimethylolpropane monoacrylate, pentaerythritol monoacrylate, 2,2-dimethyl-3-hydroxypropyl acrylate, 5-hydroxypentyl methacrylate, diethylene glycol monomethacrylate, trimethylolpropane monomethacrylate, pentaerythritol monomethacrylate, N-methylolacrylamide, N-methylolmethacrylamide, N-ethyl-N-methylolmethacrylamide, N-ethyl-N-methylolacrylamide, N,N-dimethylolacrylamide, N-ethanolacrylamide, N-propanolacrylamide, N-methylolacrylamide and other similar groups. Monomers that generate one or more alcohol groups during emulsion polymerization, such as glycidyl acrylate and glycidyl methacrylate may also be useful.

Examples of sulfonate-containing monomers include sodium 2-acrylamido-2-methylpropanesulfonate, sodium vinylsulfonate and sodium styrenesulfonate.

Examples of carboxyl group containing monomers include acrylic acid, methacrylic acid and itaconic acid. Small amounts of cross-linking monomers, e.g. not over about 5 percent by weight of total copolymer and preferably not over about 3 percent by weight, may be present. One class of cross-linking monomers are those which have reactive sites other than the double bond, as for example acrylic acid, methacrylic acid and acrylamide. Another class of cross-linking agents are compounds having two double bonds per molecule, as for example divinylbenzene and dienes such as 1,4-butadiene. A limited extent of cross-linking, either through double bonds (as with divinylbenzene, for example) or through reactive sites such as the carboxyl group (as in acrylic acid, for example) is acceptable and may even improve certain adhesive properties including tack. However, extensive cross-linking impairs tack and other adhesive properties and should therefore be avoided.

The polymers and copolymers of the invention are conveniently prepared in a latex by known emulsion polymerization techniques. Such techniques and requisite materials such as initiators, emulsifiers, etc., are disclosed in numerous references such as W. R. Sorenson and T. W. Campbell, "Preparative Methods of Polymer Chemistry", 2nd Ed., N.Y. N.Y. Wiley (1968) and M. P. Stevens, "Polymer Chemistry An Introduction" Addison Wesley Publishing Co., Reading, Mass. (1975).

Generally, the polymers are prepared by dissolving a polymerization initiator and an emulsifying agent in water. The monomers are mixed in approximately the weight ratio desired in the final polymer. The mixture is added slowly to the solution of the initiator and emulsifying agent at a temperature above about 80° C. The polymerization is allowed to proceed until the reaction is completed.

The acrylic polymers and copolymers which are commercially available, and which can be used in the practice of this invention are dispersible in water, but are not water soluble. These polymers and copolymers are water based, that is, they are supplied in the form of an aqueous dispersion and in particular an aqueous emulsion. A surfactant is usually required in order to form a stable emulsion. Typical polymer concentration is about 10–80% by weight; a more preferred range is about 20–50%. Film-forming polymers with a glass transition temperature less than about 25° C. are preferred.

Water can be added to control the rheological characteristics such as viscosity. The total amount of water should be about 20–90% by weight; a more preferred range is about 50–80%.

SURFACTANT

The choice of surfactant is important as it provides the desired wetting characteristics of the water-based emulsion on the synthetic polymer surfaces. Water and aqueous compositions typically do not "wet out" synthetic polymer surfaces, which are typically hydrophobic. That is, instead of forming a thin film covering the hydrophobic surface, the water-based composition will usually form uneven beads which are relatively thick, slow to dry, and due to their reduced surface coverage, do not yield maximum bonding effect. In the present case, it is desirable for the bonding agent to form a thin, even film across the synthetic polymer surface, which will dry quickly and form a bond with high tensile strength between the polymer surfaces.

The wettability of a liquid on a given surface can be estimated by making contact angle measurements with devices called goniometers. Generally, water on a hydrophobic synthetic polymer surface will yield a contact angle of greater than 75°. For the present invention, it is important for the contact angle to be about 50° or less. This objective can be accomplished by the addition of a judiciously selected surfactant.

Suitable surfactants are those molecules which have a chemical structure that is amphipathic (that is, exhibit surface activity) in the water-based polymer system on a synthetic polymer surface. While all classes of surfactants could potentially be used, it is preferred to use anionic surfactants, where the surface-active portion of the molecule bears a negative charge, and also nonionic surfactants, where the surface-active portion bears no apparent ionic charge.

Suitable anionic surfactants are, for example, alkyl sulfonates, alkylaryl sulfonates, alkyl sulfates, sulfates of hydroxyalkanols, alkyl and alkylaryl disulfonates, sulfonated fatty acids, sulfates and phosphates of polyethoxylated alkanols and alkylphenols, as well as esters of sulfosuccinic acid. Examples of suitable non-ionic surfactants are the addition products of 5 to 50 moles of ethylene oxide adducted to straight-chained and branch-chained alkanols with 6 to 22 carbon atoms, or alkylphenols, or higher fatty acids, or higher fatty amides, or primary and secondary higher alkyl amines; as well as block copolymers of propylene oxide with ethylene oxide and mixtures thereof.

Also, it is critical that the surfactant not react with or destabilize the emulsion. Accordingly for the aforesaid acidic emulsions which are typically stabilized by anionic surfactants, we have found that anionic surfactants of low pH and low HLB (hydrophilic-lipophilic balance) work well.

The hydrophilic-lipophilic balance (HLB) is a rough gauge of emulsification behavior, and is related to the balance between the hydrophilic behavior of one portion of the surfactant molecule and the lipophilic (hydrophobic) behavior of another portion of the same molecule. M. J. Rosen, "Surfactants and Interfacial Phenomena" Wiley-Interscience 1978, pp. 242–246. For the present invention, the HLB range for the surfactant in water is preferably 20 or less, more preferably 3–13 on a scale of zero to 40, where the lower HLB value indicates lower affinity for water. Such surfactants are commercially available. The amount used is preferably about 0.1 to 10%; and more preferably is about 0.5 to 2%.

DRYING AGENT

Metal salts are effective in hastening the drying of the bonding agent, especially when combined with amines.

Typical drying promoters include metal carboxylates, which are the reaction products of metals and organic acids. Primary drier metals include aluminum, calcium, cerium, cobalt, iron, lanthanum, lead, manganese, tin, zinc and zirconium. Non-limiting examples of metal carboxylates are stannous octoate, cobalt neodecanoate, cobalt napthenate, manganese neodecanoate and manganese napthenate and mixtures thereof. Metal carboxylates are commercially available. Examples include the Hydro-Cure series available from OMG Group, Inc, Franklin, Pa.

The metal salt can be complexed with an accelerator to make the drying agent more effective. Accelerators may be primary, secondary or tertiary amines. The accelerator can be substituted or unsubstituted and may be aliphatic or aromatic; typical examples are ethylenediamine, diethyltriamine and hexamethyltetramine, 2,2'-dipyridyl, and mixtures thereof.

The metal salt is present in concentrations of 0.001 to 3%, preferably at 0.05 to 1%. The typical accelerator level is 0.001 to 5%, preferably 0.05 to 2%.

PRESERVATIVE

Preservatives may be included for preventing growth of algae, mold, mildew, etc. Typical preservatives include sorbic acid as well as those based on dimethoxane, or 6-acetoxy-2,4,dimethyl-m-dioxane, (available as Giv-Gard DXN from Givaudan-Roure Corp., Clifton, N.J.) and 1-(3-Chloroallyl)- 3,5,7-triaza-1-azoniaadamantane, (available as Dowicil 75 from Dow Chemical Co., Midland, Mich.). Various other preservatives are known including Amical 48, or diiodomethyl-p-tolylsulfone (Angus Chemical Col., Northbrook, Ill.), Proxel GXL, or 2-n-octyl-4 -isothiazolin-3-one, (Zeneca Biocides, Wilmington, Del.) and Skane M-8, or 1,2 benzoisothiazolin-3-one, "BIT", (Rohm & Haas, Philadelphia, Pa.). The preservative is used at 0.01 to 2%; preferably at 0.1 to 0.5%. The The following Examples serve to illustrate the practice of the present invention without limiting its scope, or the scope of the claims which follow.

COMPARATIVE EXAMPLE 1

Glue-Fast SL-Poly-1 (Glue-Fast, Carlstadt, N.J.) is a commercially available aqueous palletizing adhesive for polyolefins.

COMPARATIVE EXAMPLE 2

Lock'N'Pop (from Key Tech, Ocean, N.Y.) is a commercially available aqueous palletizing adhesive for polyolefins.

COMPLEXING A METAL SALT WITH AN AMINE

An amine, for example, 40 g of ethylenediamine, was mixed with 6 g of water and stirred for a minute. A metal salt of a carboxylic acid, for example, 405 g of stannous octoate, was added and mixed with mechanical agitation. This is an exothermic reaction and the stirring was done for about 30 minutes until the entire reaction mixture was cool.

EXAMPLE 1

5 grams each of two commercial adhesive grade acrylic polymer emulsions with 44% and 47% solids were mixed. The polymer portion of the blend comprised 59% butylacrylate, 35% styrene, 4% acrylic acid and a 2% mixture of acrylamide and n-methylolacrylamide. To this mixture were added 2.35 g of water and 0.09 g of an amine salt of dodecyl benzenesulfonic acid.

EXAMPLE 2

To 10 g of the mixture produced in Example 1 were added 0.02 g of a premixed blend of a metal salt of a carboxylic acid and an amine in water: stannous octoate (1 mole); ethylenediamine (2 moles); and water (1 mole).

EXAMPLE 3

To 10 g of the mixture produced in Example 1 were added 0.02 g each of a metal salt of a carboxylic acid and an amine: 45% cobalt neodecanoate in mineral spirits (Cobalt Hydro- Cure II available from OMG Group, Inc., Franklin, Pa.) and 0.02 g. of 70% 2-2'-dipyridyl (Dri-Rx HF available from OMG).

EXAMPLE 4

A blend was made which was a 1:1 by weight mixture of the products of Example 2 and 3.

EXAMPLE 5

A 1:1 blend was prepared as in Example 4 except that in the product of Example 3, 0.07 g of Dri-Rx HF was used and in the product of Example 2, 0.07 g of the coordinate complex was used.

EXAMPLE 6

To 10 g of the product of Example 1, 0.02 g of the following pre-mixed composition was added and mixed:

|  | Moles |
|---|---|
| Cobalt Neodecanoate (~45% by weight of Cobalt Hydrocure II) | 2.5 |
| 2,2'-dipyridyl (~70% by weight of Dri-rx HF) | 1 |
| Stannous Octoate | 2.5 |
| Hexamethylenetetramine | 1 |
| Water | 1 |

EXAMPLE 7

To 10 g of the product of Example 1, 0.02 g of the following pre-mixed composition was added and mixed:

| Ingredient | Moles |
|---|---|
| Cobalt Neodecanocate (~45% by weight of Cobalt Hydrocure II) | 1.5 |
| Stannous Octoate | 1.5 |
| Diethylonetriamine | 2 |
| Water | 1 |

CHARACTERIZATION RESULTS

All the above compositions were characterized:

Contact Angle: These were measured with a Rame-Hart (Mountain Lakes, N.J.) goniometer.

Drying Test: The drying rate was determined by the weight loss due to water evaporation in 3.5 minutes of about 0.1 g of coating on the surface of polyethylene film. A coating was produced by thin drawdown of ~0.1 g of the compositions on 2.5"×3" polyethylene (shrink wrap) film stuck to a Teflon bar with double sided stickyback tape. The weight loss was then determined over time by positioning this entire specimen in the chamber of an analytical balance.

Physical Tests: These were run on an Instron 4201 tensile testing machine (Instron Corp., Canton, Mass.). About 0.5 g of the composition was spread on a 3.5" by 5" polyethylene shrink wrapped on cardboard ("coupon"). The coating was drawn down to a thin layer and lightly spread by hand to obtain a thin and fairly uniform film. The coating was allowed to dry until the film was thin, uniform and slightly damp, (but not wet, according to tactile testing). Another coupon was then placed on top of this coating. The sandwich of coupons was weighed down with 1,000 g overnight and then tested. The physical data are reported as the maximum load required for break and are the average values for duplicate samples.

| EXAMPLE | CONTACT ANGLE (degrees) | DRYING RATE % Weight Loss in 3.5 minutes | SHEAR STRENGTH (lbs at max. load) | PEEL STRENGTH (lbs at max. load) |
|---|---|---|---|---|
| Comparative Example 1 | 65 | 10.0 | 14.3 | 2.07 |
| Comparative Example 2 | 66 | 20.0 | 12.8 | 1.14 |
| 1 | 39 | 10.4 | 11.5 | 0.08 |
| 2 | 47 | 11.3 | 12.5 | 0.23 |
| 3 | 51 | 14.4 | 11.1 | 0.16 |
| 4 | 49 | 20.6 | 9.4 | 0.05 |
| 5 | 49 | 18.6 | 10.3 | 0.13 |
| 6 | 48 | 24.3 | 9.7 | 0.22 |
| 7 | 39 | 25.1 | 13.4 | 0.08 |

The examples show comparable shear strength and lower peel strength than the commercially available materials (Comparative Examples 1 and 2). The lower peel strength is desirable, as the packages should be easily removed from a pallet by an operator. In many cases, the examples also have higher drying rates, which are also desirable. The Comparative Examples show a disadvantage in that the contact angle is high, indicating reduced wettability.

EXAMPLE 8

The material of Example 7 was compared with the material of Comparative Example 2 in a field test. Pallets of filled bags with polyethylene surfaces (18 lb and 30 lb) were sprayed with the bonding agents and unitized. The pallets made with the material of Example 7 bonded well and the bags did not dislodge even on vigorous maneuvers with a forklift; pallets made with the material of Comparative Example 2 were not bonded as well, and the bags shifted. Upon depalletizing, the bags of Example 7 lifted off easily and the dried film was clear and non-tacky; in the case of Comparative Example 2, the bags lifted off less easily and the dried film was clear, but tacky.

What is claimed:

1. A water-based bonding agent for single use on synthetic polymer surfaces consisting essentially of
   (a) one or more acrylic polymer or copolymer emulsion(s) in water, the polymer or copolymer having hydrophobic and hydrophilic segments and film forming properties;
   (b) a drying agent comprising a metal carboxylate complexed with an amine wherein the metal carboxylate is selected from the group consisting of stannous octoate, cobalt neodecanoate, cobalt napthenate, manganese neodecanoate and manganese napthenate and blends thereof;
   (c) a surfactant having an HLB of <20:
   (d) optionally, a preservative;
   (e) water.

2. The material of claim 1, wherein the metal carboxylate is a blend of stannous octoate and cobalt neodecanoate.

3. The material of claim 2, wherein the amine is selected from the group consisting of ethylenediamine, diethylenetriamine, hexamethylenetetramine, 2-2"-dipyridyl and mixtures thereof.

4. The material of claim 1, wherein the surfactant is anionic or a mixture of anionic and nonionic surfactants having an HLB range of about 1–13.

5. The material of claim 1, wherein the components are formulated, in weight percent:
(a) 10–80;
(b) 0.001–3;
(c) 0.1–10;
(d) 0–2;
(e) balance.

6. The material of claim 1, wherein the components are formulated, in weight percent:
(a) 20–50;
(b) 0.05–1;
(c) 0.5–2;
(d) 0–0.5;
(e) balance.

7. The material of claim 1, wherein the preservative is included, and is selected from the group consisting of sorbic acid, dimethoxane, 1-(3-chloroallyl)-3,5,7-triaza-1-azoniaadamantane, diiodomethyl-p-tolylsulfone, 2-n-octyl-4-isothiazolin- 3-one, 1,2 benzoisothiazolin-3-one, or mixtures thereof.

8. A an improved method of palletizing packages, the improvement comprising applying the material of any one of claims 1–7 to packages having synthetic polymer surfaces and stacking the packages on a pallet, whereby the surfaces contacted by the bonding agent material form a bond that minimizes shifting of the packages.

9. A unitized load of packages having synthetic polymer surfaces bonded by the material of any one of claims 1–7.

* * * * *

UNITED STATES PATENT AND TRADEMARK OFFICE
CERTIFICATE OF CORRECTION

PATENT NO. : 5,500,470
DATED : March 19, 1996
INVENTOR(S) : Srinivas K. Mirle; Eugene E. Carney It is certified that error appears in the above-indentified patent and that said Letters Patent is hereby corrected as shown below:

Column 9, line 3, delete "1-13"; insert — 3 - 13 —.

Signed and Sealed this

Twenty-fifth Day of June, 1996

*Attest:*

BRUCE LEHMAN

*Attesting Officer*     *Commissioner of Patents and Trademarks*